US005406236A

United States Patent [19]

Newell et al.

[11] Patent Number: 5,406,236

[45] Date of Patent: Apr. 11, 1995

[54] CERAMIC BLOCK FILTER HAVING NONSYMMETRICAL INPUT AND OUTPUT IMPEDANCES AND COMBINED RADIO COMMUNICATION APPARATUS

[75] Inventors: Michael A. Newell, Placitas; David R. Heine, Albuquerque, both of N. Mex.

[73] Assignee: Motorola, Inc., Schaumburg, Ill.

[21] Appl. No.: 991,601

[22] Filed: Dec. 16, 1992

[51] Int. Cl.[6] .................... H01P 1/205; H04B 1/38

[52] U.S. Cl. .................... 333/206; 333/33; 455/82

[58] Field of Search .................... 333/134, 33, 32, 202, 333/206, 207

[56] References Cited

U.S. PATENT DOCUMENTS

| | | | |
|---|---|---|---|
| 4,879,533 | 11/1989 | de Muro et al. | 333/206 |
| 4,896,124 | 1/1990 | Schwent | 333/206 |
| 4,937,542 | 6/1990 | Nakataka | 333/206 X |
| 4,954,796 | 9/1990 | Green et al. | 333/206 |
| 5,208,566 | 5/1993 | Kenoun et al. | 333/206 |

FOREIGN PATENT DOCUMENTS

| | | | |
|---|---|---|---|
| 0165103 | 8/1985 | Japan | 333/202 |
| 0235801 | 10/1987 | Japan | 333/202 |
| 0205102 | 8/1990 | Japan | 333/202 |
| 0103203 | 4/1992 | Japan | 333/202 |

*Primary Examiner*—Seungsook Ham
*Attorney, Agent, or Firm*—Gary J. Cunningham; Joseph P. Krause

[57] ABSTRACT

Ceramic block filters can be constructed to have non-symmetrical, i.e. unequal, input and output impedances. These filters can be used to eliminate impedance matching networks in radio communications devices. These impedance matching networks (22, 14) are precluded when the input and/or output of a ceramic block filter (100) is controlled by appropriate selection of the physical parameters of the block to achieve a direct impedance match between an adjacent circuit element and subsequent signal processing stages in the device.

4 Claims, 2 Drawing Sheets

—PRIOR ART—

—PRIOR ART—

100-1

100-2

100-3

100-5

CERAMIC BLOCK FILTER HAVING NONSYMMETRICAL INPUT AND OUTPUT IMPEDANCES AND COMBINED RADIO COMMUNICATION APPARATUS

FIELD OF THE INVENTION

This invention relates to electrical filters. More particularly this invention relates to ceramic block filters, devices which are increasingly used in radio communications devices.

BACKGROUND OF THE INVENTION

Dielectric block filters are well known art. U.S. Pat. No. 4,431,977, for example, discloses a ceramic block filter. Numerous other U.S. patents disclose improvements that these devices have realized over the past few years.

Ceramic block filters have found wide acceptance for use in radio communications devices, particularly high frequency devices such as selective call receivers (pagers), cellular telephones, and other two-way radio devices. The blocks are relatively easy to manufacture, rugged, have improved performance characteristics over discrete lumped circuit elements, and are relatively compact.

For purposes largely related to simplified manufacturing prior art ceramic block filters are designed and constructed to have substantially identical input and output impedances; input and output ports of a ceramic block filter are frequently constructed so that the filter blocks have virtually identical or symmetrical input and output impedance values. As a consequence of ceramic block filters being designed and constructed to have symmetrical input and output impedance values, their use in a radio communications device frequently necessitates the addition of impedance matching networks to accomplish maximum power transfer through them.

Consider for example the antenna's frequently used in cellular telephones, which might have input impedances of approximately 50 ohms. In contrast, the output power amplifier stage of the transmitter section of a cellular phone can have an output impedance that is substantially lower, frequently less than 20 ohms. Most ceramic block filters have a characteristic 50 ohm input and a 50 ohm output impedance. To accomplish maximum power transfer between the power amplifier stage and the antenna, an impedance matching network must be inserted between the output of the power amplifier stage and the input of the transmit filter, when the transmit filter output is coupled directly to the antenna.

FIG. 1 discloses a block diagram of a portion of a radio communications device (10-1) known in the prior art. The power amplifier stage (12), with an output impedance value of $Z_1$ requires an impedance matching network (14) to maximize the power transfer from the power amplifier stage (12) to the antenna (18) through the ceramic block transmit filter (16). The impedance matching network (14) has an input impedance $Z_2$ that is substantially identical to the output impedance $Z_1$ (or the complex conjugate) of the power amplifier (12). Similarly, the impedance matching network (14) has an output impedance $Z_3$ that is substantially identical to the input impedance (or the complex conjugate) of the transmit filter (16), $Z_4$. As is well known in the art, the transmit filter (16) output impedance $Z_5$ is preferably equal to or near equal to the input impedance $Z_6$ of the antenna (18).

FIG. 3 discloses a simplified block diagram of a portion of a radio receiver apparatus 11-1. In FIG. 3 the antenna (18) has a characteristic impedance substantially equal to the input impedance $Z_{10}$ (or the complex conjugate) of the receiver filter stage (100). The receiver filter (100) which is a ceramic block filter has an output impedance $Z_{11}$ that is substantially equal to the input impedance $Z_{12}$ (or the complex conjugate) of an impedance matching network (22). The impedance matching network (22) is constructed to have an output impedance $Z_{13}$ substantially equal to the input impedance $Z_{14}$, or the complex conjugate, of the rest of the amplifier stage represented by circuit block (24) and labelled as an amplifier/mixer.

A ceramic block filter that could eliminate the need for an impedance matching network between signal processing stages in a radio communications device would be an improvement over the prior art.

DESCRIPTION OF A PREFERRED EMBODIMENT

Figure 1:
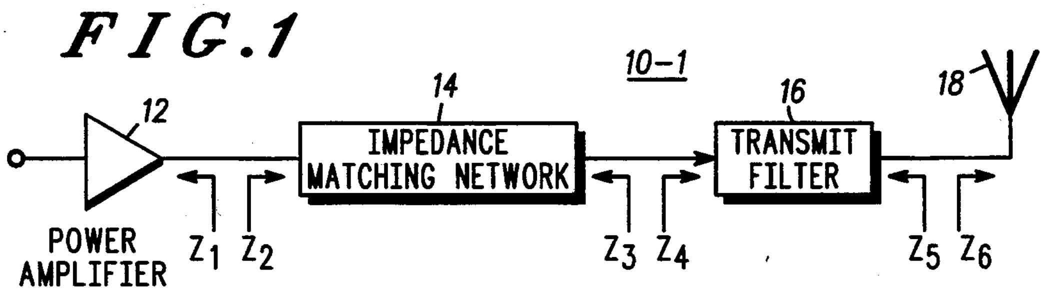
FIG. 1 shows a simplified block diagram of a prior art transmitter stage using an impedance matching network.

In FIG. 1, shows a simplified block diagram of a radio transmitter (10-1). The block diagram shown in FIG. 1 is only a partial diagram of the transmitter device, showing only the power amplifier (12), an impedance matching network (14) and an output transmit filter (16) coupled to the antenna (18). As is well known in the prior art, the transmit filter (16), which is a ceramic block filter, has uniform or symmetrical input and output impedances ($Z_4$ and $Z_5$).

In radio communications devices, such as cellular telephones, and two-way radios, the input impedance $Z_6$ of the antenna (18) typically has a characteristic or nominal value, typically equal to 50 ohms. In radio transmitters, it has been the practice in the prior art to have the transmit filter (16) output impedance $Z_5$ match the input impedance of the antenna. Prior art ceramic block filter designs typically set the input and output impedance ($Z_4$ and $Z_5$) for the transmit filter (15) substantially equal to 50 ohms.

As is also well known in the art, the output impedance $Z_1$ of the power amplifier stage (12) is frequently a very low value, frequently less than 20 ohms. Merely coupling the output of the power amplifier stage (12) to the input of the transmit filter (16) when the output power amplifier's impedance $Z_1$ is so low, would cause a significant power transfer loss between the power amplifier stage (12) and the transmit filter stage (16). Accordingly, an impedance matching network (14) is commonly used to couple the power amplifier stage (12) to the transmit filter (16).

An impedance matching network (14) as shown in FIG. 1, is frequently accomplished by the use of networks that have low input impedances $Z_2$ and relatively high output impedances $Z_3$. While the use of an impedance matching network (14) does improve the power transfer between the power amplifier stage and the antenna (18), it is additional circuitry that must be included in a radio communications device that if it were eliminated the radio's design could be simplified, the cost reduced, and performance increased.

Figure 2:
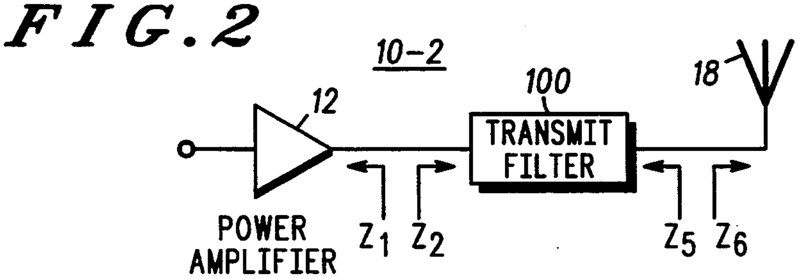
FIG. 2 shows a simplified block diagram of an improved radio communications device using a ceramic block filter element with non-symmetrical input/output impedances.

In FIG. 2, a simplified block diagram for a radio transmitter communication device 10-2 is shown. In FIG. 2, the impedance matching network of FIG. 1 (14) has been eliminated by the use of a ceramic block filter transmit filter (100) that has non-symmetrical, i.e. unequal, input and output impedances ($Z_2$ and $Z_5$ respectively). To maximize power transfer from the amplifier (12) to the antenna (18), the transmit filter (100) preferably has an input impedance $Z_2$ substantially equal to the output impedance of $Z_1$ (or the complex conjugate) of the power amplifier stage (12). Similarly, the output impedance $Z_5$ is substantially equal to the input impedance of the antenna (18), $Z_6$ (or the complex conjugate). Such a filter might have an input impedance $Z_2$, either greater or less than the output impedance $Z_5$. Input and output impedances can be controlled by changing various physical characteristics of the block filter (100).

Figure 3:
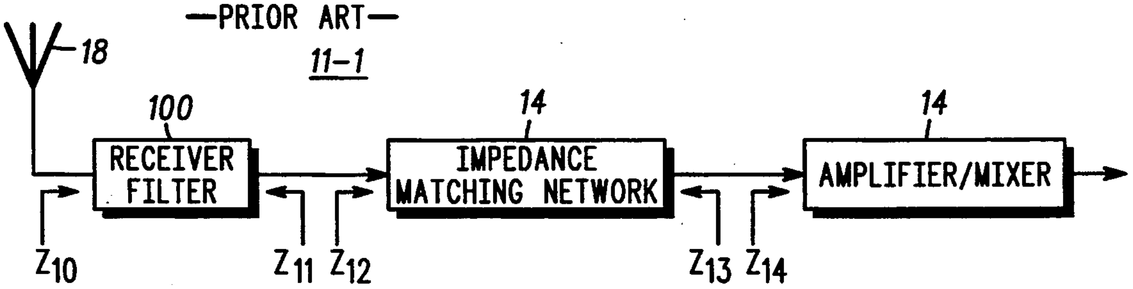
FIG. 3 shows a simplified block diagram of a prior art radio receiver device using an impedance matching network.

Radio communication receiver circuits can benefit from ceramic block filters having non-symmetric input/output impedances. FIG. 3 shows a simplified block diagram of a prior art radio receiver apparatus having an impedance matching network (22) used to couple the receiver filter (100) to the subsequent signal processing stages (24). Similar to the transmitter described above, the receiver circuitry (11-1) has a receiver filter stage (100) with an input impedance $Z_{10}$ substantially equal to the impedance (or the complex conjugate) of the antenna (18). Signals output from the receiver filter (100) having an output impedance $Z_{11}$ are coupled to an impedance matching network (22) having an input impedance $Z_{12}$ substantially equal to the output impedance $Z_{11}$ (or the complex conjugate) of the filter (100).

The impedance matching network (22) has an output impedance $Z_{13}$ substantially equal to the input impedance $Z_{14}$ (or the complex conjugate) of the subsequent stage (24) so as to maximize the power transfer between the antenna and the signal processing stages of the receiver (24). This is required because frequently the input impedances of stages in the subsequent signal processing (24) have impedances that are substantially different from the output impedance of the receive filter (100). Since prior art ceramic block filters have input and output impedances that are virtually identical or symmetrical, the impedance matching network (22) shown in FIG. 3 is required to improve the receivers performance.

Figure 4:
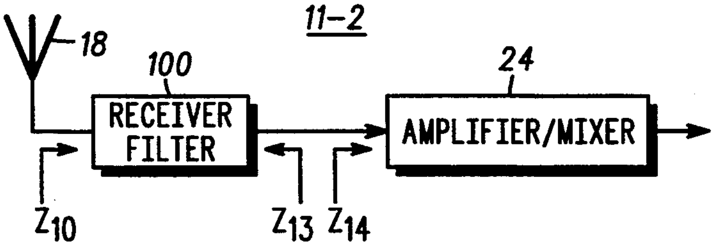
FIG. 4 shows a simplified block diagram of an improved radio communications receiving device using a ceramic block filter element with non-symmetrical input/output impedances.

Elimination of the impedance matching network in a radio receiver apparatus can be realized by the use of a ceramic block filter (100) such as that shown in FIG. 4. In FIG. 4, the receiver filter (100) has an input impedance $Z_{10}$ substantially equal to the characteristic impedance (or the complex conjugate) of the antenna (18) and has an output impedance $Z_{13}$ substantially equal to the input impedance, $Z_{14}$, (or the complex conjugate) of the subsequent receiver processing stages (24).

In addition to the significant parts count reduction that can be realized by using a ceramic block filter with non-symmetric impedances, signal power loss that always accompanies passive devices, is reduced. In battery powered communications devices, such reduced power losses can be used to alternatively prolong battery life or increase the performance of the device. By judiciously selecting the geometry of the block filter, the filter can have its input and output impedances tailored to a particular application.

Figure 5A:
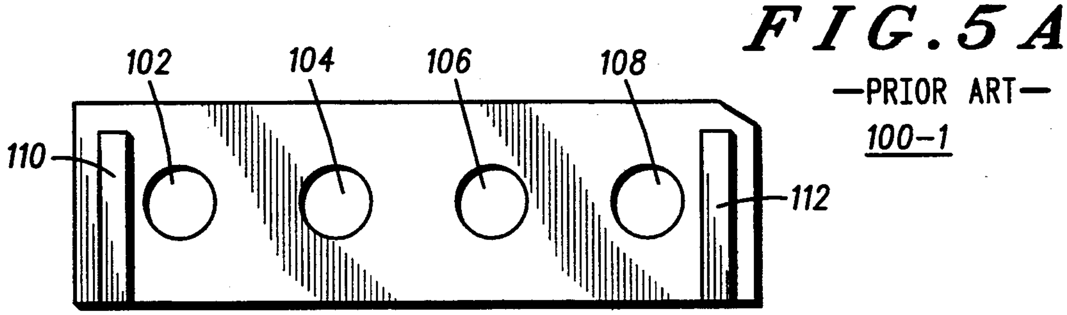
FIG. 5A shows the top pattern of a prior art block filter having symmetrical, (uniform or equal) input and output impedances.

FIG. 5A shows the top-view of a prior art ceramic block filter (100-1) that includes four metallized holes (102, 104, 106, and 108). (Those skilled in the art will recognize that block filters are typically comprised of parallelpiped-shaped blocks; that these blocks include at least one through-hole; that the interior surfaces of the holes and exterior surfaces, except for the top surface, are metallized; that I/O ports comprised of electrically isolated areas on either the top or side surfaces are points of connection.) Signals are either coupled into or out of the block filter (100-1) by input/output coupling strips (110 or 112). Since the geometry of these input/output steps and their placement with respect to the holes is substantially identical, the input and output impedances to the filter will be also virtually identical.

A decrease in the input (or output) impedance of the filter shown in FIG. 5A can be realized by changing the input (or output) coupling to one of the holes. In the embodiment shown in FIG. 5B the input (or output) coupling capacitance is increased or decreased by changing the block's top pattern (111), so as to decrease or increase respectively, the separation distance between the I/O pattern (111) and the first resonator hole (102). Such spacing changes can thereby produce an increased or decreased coupling capacitance between the metallization lining the hole (102) and the material of the trace (111) to produce a decreased or increased input or output impedance. The ceramic block filter of FIG. 5B can be thought of as having a first top surface pattern to produce a first valued input impedance and a second top surface pattern to produce a second valued output impedance. The filter is otherwise identical to that shown in FIG. 5A.

In addition to being capacitively coupled to together, the metallization lining the hole and metallization on the top of the block can also be inductively coupled together. Changing the inductive coupling between the metallization lining the holes and the input/output terminals can also be used to change the input and output impedances of a block filter. In some embodiments, input/output ports might be primarily inductively coupled to metallization lining the holes. In some other embodiments, an input/output port might have a first-valued capacitive coupling to at least one hole of the block while a second output/input port could have a second-valued inductive coupling to the same or another hole. These first and second valued capacitive and inductive coupling can account for differing impedances.

If trace 111 is an input terminal, the increased capacitive coupling to the first resonator hole (102) effectively produces a ceramic block filter having a relatively low input impedance but yet having a relatively high output impedance; the rest of the electrical characteristics of the filter being substantially unchanged. Such a filter is shown in FIG. 5B could, for example, be used to directly couple the power amplifier stage (12) to the antenna (18) as shown in FIG. 2.

Figure 5B:
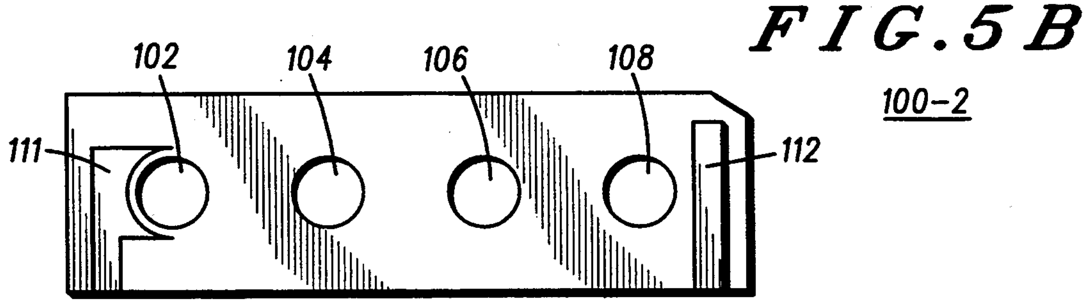
FIG. 5B shows a top pattern on a ceramic block filter used to achieve non-symmetrical input and output impedances.
Figure 5C:
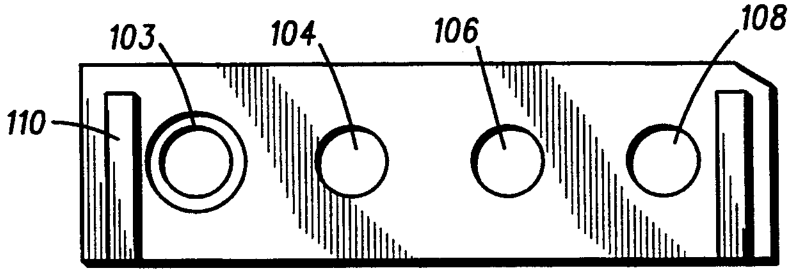
FIG. 5C shows the top view of an alternate embodiment of a block filter using a chamfered hole to achieve a non-symmetrical input and output impedance.

FIG. 5C shows the top pattern of another embodiment of a ceramic dielectric block filter (100-3) that has increased capacitive coupling to the input (or for that matter output port) achieved by means of a chamfered hole (103). The top chamfering of the hole increases its diameter and thereby moving it closer to the coupling bar (110). In FIG. 5C, the block (100-3) has at least first and second holes (103 and any of holes 104, 106, or 108) that have first and second cross-sectional shapes respectively. Different embodiments of different cross-sectional shapes would of course include first and second holes that have first and second diameters, metallization lining thicknesses, circular and elliptical cross-sections, etc. Other embodiments might use notches, indentations, etc., to modify the characteristic impedances of a block filter.

Those skilled in the art will recognize that either embodiment shown in FIG. 5B or 5C with improved capacitive coupling to the coupling trace (111) in FIG. 5B or (110) in FIG. 5C can be used in either direction in that the filters are bi-directional. Stated alternatively, if the filter shown in FIG. 5B and FIG. 5C are in applications that require a low output impedance, the increased capacitive coupling between the resonator hole (102) and the input coupling pattern (111) would merely be connected as an output port rather than an input.

Figure 6:
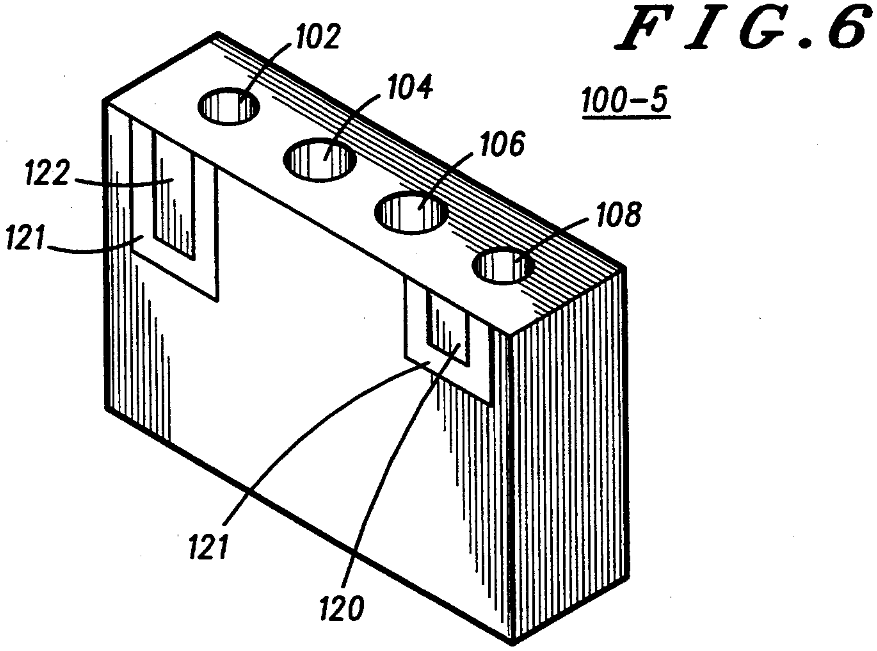
FIG. 6 shows a perspective view of a block filter having asymmetrical I/O pads to achieve non-symmetrical input and output impedances.

FIG. 6 shows a perspective view of another embodiment of a dielectric block filter that has non-symmetrical or unequal input and output impedance values achieved by using dissimilar, first and second, side-mounted I/O pads (120 and 122). One of these pads (122) is substantially larger in surface area than the other thereby increasing the capacitive coupling to the first resonator hole (102). (The resonator holes 102, 104, 106, and 108 are metallized through holes that extend completely through the block. Either hole 102 or 108 could be considered an input resonator depending upon the orientation of the block in the circuit. Accordingly, either input pad 120 or 122 could be considered an input pad as well.) The metallization that comprises these I/O pads is separated from the metallization lining of the rest of the block by means of unmetallized areas (121) that substantially surround the I/O pads as shown. By increasing the surface area of one of the I/O pads, the input impedance at that corresponding port is decreased accordingly. Similarly, decreasing the surface of the area of the pad would increase the input impedance as well.

It can be seen from the foregoing that in many radio communication devices, a reduction in parts count, reduction of passive-device power loss and simplification of a radio's design can be realized by the appropriate use of ceramic block filters having unequal input and output impedances. Such non-symmetrical input and output impedance block filters can be achieved principally by the predetermined selection of various physical parameters of the block filter. Those skilled in the art will recognize that some of the parameters of a ceramic block filter that can be changed, are the hole diameters, the hole cross-sectional shapes, the top patterning surrounding the input and output holes, the input and output pads surface area, and so forth.

All the embodiments shown in the figures have depicted a block filter used to couple signals to or from an antenna, the invention would also find application in interstage impedance matching in radio transmitter/-receiver circuits as well. Alternate embodiments of the invention would also include ceramic block filter duplexers, wherein a single common node is connected to an antenna and a first output is coupled to a receiver another input connected to the output of a transmitter.

What is claimed is:

1. A radio communications transmitter device comprised of:

a power amplifier device having an output and a first-valued output impedance $Z_1$;

an antenna from which radio signals from said amplifier device are broadcast, said antenna having an input and a second-valued input impedance $Z_2$, $Z_2$ being substantially different than $Z_1$;

a substantially parallelepiped-shaped ceramic block filter, having an input port coupled to the output of said power amplifier device and an output port coupled to the input of said antenna, said input port of said ceramic block filter having an input impedance substantially equal to one of $Z_1$ and the complex conjugate of $Z_1$, said output port of said ceramic block filter having an output impedance substantially equal to equal to one of $Z_2$, and the complex conjugate of $Z_2$, and said ceramic block having at least a first chamfered through-hole and a second through-hole and further having a first top metallization pattern capacitively coupled to the first through-hole to produce said input impedance and a second top metallization pattern capacitively coupled to the second through-hole to produce said output impedance, defining an impedance matching device.

2. A radio communications receiver device comprising:

an antenna having a first-valued characteristic impedance;

a radio signal demodulating device having a second-valued input impedance, said first-valued impedance substantially different from said second-valued impedance;

a substantially parallelepiped-shaped ceramic block filter, having a side-mounted input port directly coupled to said antenna and a side-mounted output port directly coupled to said demodulating device, said input port of said ceramic block filter having an input impedance substantially equal to one of the first-valued impedance and complex conjugate of said first-valued impedance, and having an output impedance substantially equal to one of said second-valued impedance and the complex conjugate of the second-values impedance, said ceramic block filter also having at least a first chamfered through-hole and a second unchamfered through-hole and the input port having a first top surface pattern capacitively coupled to the first chamfered through-hole to produce the first-valued input impedance and the output port having a second top surface pattern capacitively coupled to the second through-hole to produce the second-valued output impedance, defining an impedance matching device.

3. The radio communications receiver device of claim 2 where said at least first and second through holes have first and second cross-sectional shapes.

4. The radio communications receiver device of claim 2 wherein said side-mounted input port and said side-mounted output are comprised of first and second side-mounted pads capacitively coupled to said first and said second through-holes respectively.

* * * * *